Patented Feb. 22, 1927.

1,618,959

UNITED STATES PATENT OFFICE.

MARTHA LONGLEY, OF CHICAGO, ILLINOIS.

LIQUID CLEANSER.

No Drawing. Application filed June 18, 1923. Serial No. 646,229.

This invention relates to a cleaning composition and has for its object the production of a composition of this character which is highly effective in removing grease, dirt, and stains from windows, glass showcases, floors, woodwork, and the like.

A further object of the invention is to provide a cleansing composition which cleans and bleaches woodwork, without injuring or removing the luster, removes stains and polishes glass, and dries quickly wherever used.

The composition embodying this invention comprises the following ingredients mixed in about the proportions stated, although it should be understood that the proportions may be varied without departing from the spirit of the invention: water, substantially pure, 1 gallon; oxalic acid, 1 pound; sal-soda, 1 pound; ether, 3 ounces; oil of lavender, 1 c. c. (20 drops); acid orange coloring, $\frac{1}{10}$th grain.

In preparing this composition, the water is heated until it is hot, the oxalic acid is then put in and thoroughly agitated and mixed. The sal-soda is next introduced and thoroughly agitated, mixed and dissolved. The solution is then set aside until cold whereupon the ether, oil of lavender and orange coloring may be introduced and thoroughly mixed. The composition is then set aside in glass, or other suitable containers and is ready for use whenever desired. This composition is particularly desirable for use in cleaning windows, glass showcases and the like, as it is quick drying and cleansing, and easily applied with a cloth or chamois, and the glass can be quickly polished to add luster thereto.

In cleaning floors or woodwork, they are polished with a cloth or the like saturated with the liquid cleanser and polished with a dry cloth. As this composition has certain bleaching qualities, it is also particularly adapted for cleaning floors and woodwork as well as cleaning and polishing glass.

I claim:

1. A liquid cleanser for glass, consisting of the reaction products of one pound of oxalic acid, one pound of sal soda, and three ounces of ether.

2. A liquid cleanser for glass, consisting of the reaction products of one pound of oxalic acid, one pound of sal soda, one gallon of water and three ounces of ether.

3. A liquid cleanser for glass, consisting of the reaction products of one pound of oxalic acid, one pound of sal soda, one gallon of water, three ounces of ether, and twenty drops of oil of lavender.

4. A liquid cleanser for glass, consisting of the reaction products of one pound of oxalic acid, one pound of sal soda, one gallon of water, three ounces of ether, twenty drops of oil of lavender, and a coloring matter.

MARTHA LONGLEY.